United States Patent
Allen et al.

[11] 3,786,881
[45] Jan. 22, 1974

[54] TARE ADJUSTING APPARATUS FOR A COMPUTING SCALE SYSTEM

[75] Inventors: Kenneth C. Allen; Edwin E. Boshinski, both of Dayton, Ohio

[73] Assignee: The Hobart Manufacturing Company, Troy, Ohio

[22] Filed: Nov. 30, 1972

[21] Appl. No.: 310,763

Related U.S. Application Data

[60] Continuation-in-part of Ser. No. 85,139, Oct. 29, 1970, which is a division of Ser. No. 422,730, Dec. 31, 1964, Pat. No. 3,557,353.

[52] U.S. Cl.......................... 177/3, 177/45, 177/165
[51] Int. Cl.. G01g 23/38, G01g 23/18, G01g 13/14
[58] Field of Search........ 177/1, 45, 50, 125, 165, 3

[56] References Cited
UNITED STATES PATENTS

| | | | |
|---|---|---|---|
| 2,610,052 | 9/1952 | Macgeorge | 177/165 |
| 2,931,639 | 4/1960 | Lauler et al. | 177/3 |
| 2,974,863 | 3/1961 | Williams, Jr. et al. | 177/3 UX |

Primary Examiner—George H. Miller, Jr.
Attorney, Agent, or Firm—Biebel, French Bugg

[57] ABSTRACT

Tare adjusting apparatus for a computing scale system wherein tare adjustment is accomplished by manual positioning of an adjustment knob which is connected to turn off a tare signal light when the knob is touched. This requires the operator to adjust the tare before each weighing, or to touch the knob if the tare adjustment is the same as for the previous weighing. Thus there is avoided any inadvertent use of an incorrect tare weight when weighing a product or computing the value thereof. Further there is disclosed an error detecting circuit which causes the tare signal light to be lit if the operator touches the tare adjustment knob while the scale is weighing the product. The touch control feature is implemented by constructing the tare adjustment knob as a part of an oscillation circuit. When the operator touches the tare adjustment knob his body capacitance is introduced into this oscillation circuit. This in turn produces a flipping of the output of a flip-flop which is connected to control the operation of the tare signal light.

For the error detecting embodiment there is provided a logic circuit to control the turning off of the signal light once it has been inadvertently lighted. This logic circuit operates in accordance with one or the other of two disclosed control modes under the joint influence of the output from the tuned oscillation circuit and a signal indicative of the presence of weight on the scale. One control mode requires the operator merely to unload the scale while the other control mode requires him to unload the scale and touch the tare adjusting knob during the unloaded condition.

16 Claims, 5 Drawing Figures

3,786,881

TARE ADJUSTING APPARATUS FOR A COMPUTING SCALE SYSTEM

CROSS REFERENCE TO RELATED APPLICATIONS

This application is a continuation-in-part of Ser. No. 85,139 filed Oct. 29, 1970 which in turn is a divisional of Ser. No. 422,730, filed Dec. 31, 1964, now U.S. Pat. No. 3,557,353. It is also related to Ser. No. 139,372, filed May 3, 1971 which is assigned to the assignee of this application.

BACKGROUND OF THE INVENTION

This invention relates to tare adjustment apparatus for computing scale systems of the type which include a scale and a computer for weighing and automatically computing the price of each of successively weighed loads or articles.

A system of the general type to which the invention relates is shown in Allen U.S. Pat. No. 3,045,229 wherein the scale is power operated and includes a servomechanism driving a plurality of readout switches, and the computer includes a series of relays which first store the weighing factor digits and then cooperate with unit price selector switches to effect computation of the value of the weighed load.

More particularly the tare adjustment apparatus of the present invention is used in combination with a solid state computing system which includes a pulse generator, a program counter, and a plurality of pulse counters. In such a computing system all operations of readout, storage, and computing are effected by appropriate control of the transmission of pulses throughout the system. The scale which is embodied in this combination is read out by photoelectrical transducers, and the weight digits are temporarily stored in counters which receive the proper number of pulses through gates controlled by the photoelectrical transducers in accordance with the balance position of the scale. These weighing storage counters then cooperate with other counters and price selector switches to operate additional gates which control the transmission of pulses to value storage counters. Finally, the weight and value storage counters may transmit their stored information to a printer which prints and issues a ticket or label bearing thereon the unit price, weight, and value of the related load. Alternatively, the weight and value storage counters may transmit their stored information to a digital display as described in Ser. No. 139,372.

In computing scale systems of the above-mentioned types it is desirable to make tare adjustments so that the weight of the container will not be included in the indicated weight or the computed value of the product. Prior art computing scale systems have provided tare adjustment mechanisms for this purpose, as shown for instance in Allen U.S. Pat. No. 3,037,563. Also as shown in the Allen patent there have been provided interlock systems actuated by adjustment of input unit price information and operative thereafter to prevent operation of the scale until such time as the operator has physically moved the tare adjustment knob.

SUMMARY OF THE INVENTION

This invention provides improved tare adjusting apparatus wherein a tare warning light is automatically lighted at power turn on and at other times when a tare adjustment may be required. Tare adjustment is accomplished by operator control of a tare adjustment knob which is connected to tare adjusting means and also to an oscillation circuit. This circuit is interconnected to the tare warning light whereby the light is turned off by operator contact with the tare adjustment knob. Thus the operator is warned to make new tare adjustments as required. Other apparatus may be provided for inhibiting scale readout or ticket printing if the operator attempts to weigh an article while the tare adjusting light is lit.

This invention further provides improved tare adjusting apparatus having a touch operated tare warning light and error detecting means which cause automatic lighting of the tare warning light if the tare adjustment knob is touched while a weighing operation is in progress. It is therefore an object of this invention to provide tare adjusting apparatus for a scale having an indicator for warning when a tare adjustment is required. It is also an object of this invention to provide touch operated means for discontinuing the aforesaid warning when a required tare adjustment has been made. A further object of this invention is to provide a warning when a tare adjustment has been made at an improper time. Still another object of this invention is to provide a circuit for touch control of a tare warning light.

Other objects and advantages of the invention will be apparent from the following description, the accompanying drawings and the appended claims.

DESCRIPTION OF THE PREFERRED EMBODIMENTS

Figure 1:
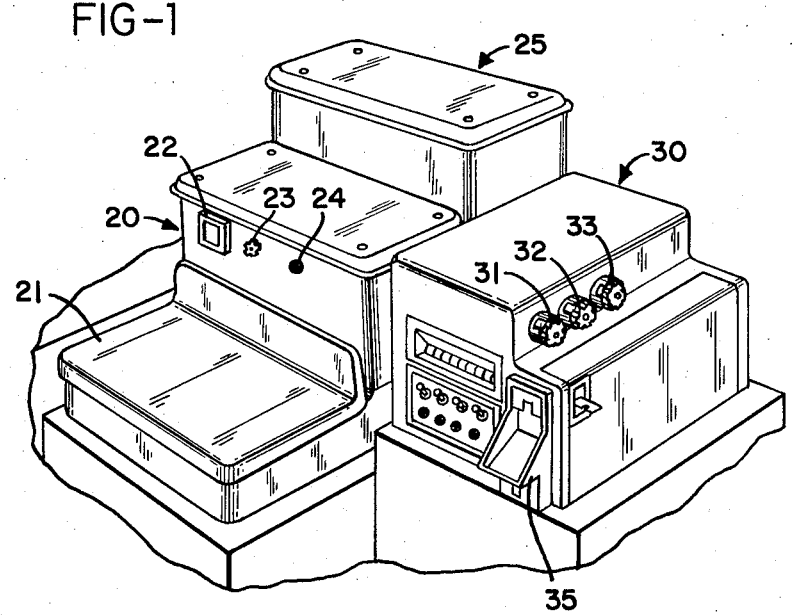
FIG. 1 is a perspective view showing a complete weighing, computing and printing system incorporating this invention.

Referring to the drawings which illustrate preferred embodiments of the invention, FIG. 1 represents an automatic computing scale system which includes a weighing scale 20 having a scale platter 21. The scale 20 is shown as including a window 22 for visually reading the weight, a tare adjustment knob 23, and a signal light 24 which is lit whenever the tare setting may require adjustment.

A computer 25 is shown as mounted adjacent the scale 20 and it receives the weight information from the scale for combining with a selected price per unit of weight to compute the value of a weighed article. The computer 25 supplies the weight and value information to the register-printer 30, which may be constructed as shown in Allen U.S. Pat. No. 2,948,465. The register-printer 30 is provided with manual control knobs 31, 32 and 33 which correspond respectively to cents, dimes, and dollars per pound and are operatively connected with computing circuits in computer 25 as described in detail in U.S. Pat. No. 3,557,353. Computer 25 accepts the unit price from knobs 31 to 33 and combines this with the weight measured by scale 20 to produce the computed value of the weighed article. The register-printer 30 also incorporates a ticket ejector mechanism indicated at 35 which may be constructed as shown in Allen et al U.S. Pat. No. 2,948,466. The scale may be generally constructed in accordance with Meeker et al. U.S. Pat. No. 2,723,113.

Figure 2:
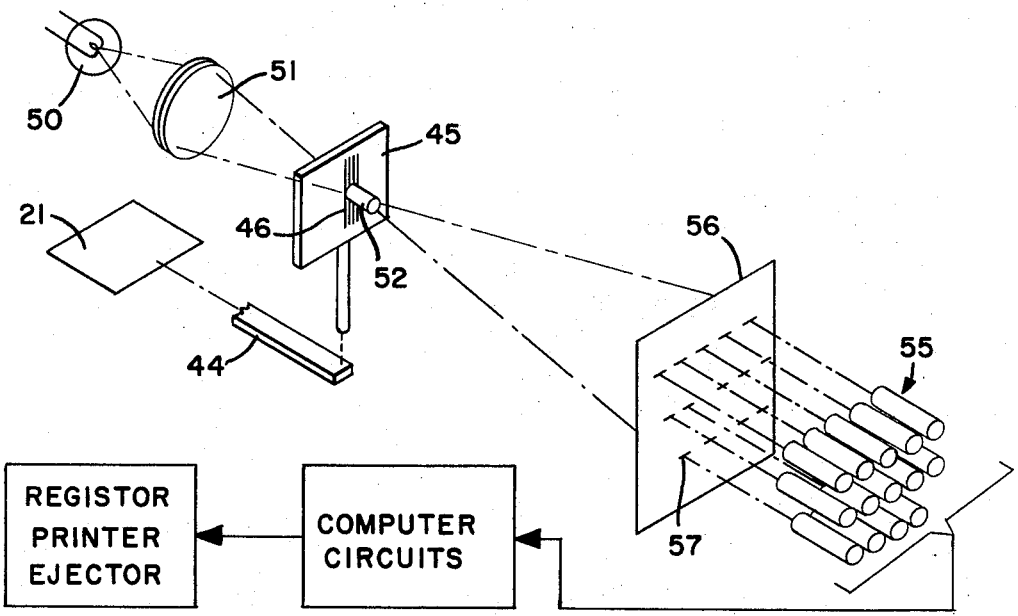
FIG. 2 is a diagrammatic view of a fragment of the system of FIG. 1.

Pertinent parts of scale 20 are shown diagrammatically in FIG. 2 as including a lever 44, which constitutes a part of the weighing mechanism connected for movement with the platter 21, and an optical chart 45 which is supported for movement by the lever 44 according to the balance position of the scale platter 21. Weight information, i.e. a range of weights, is encoded on the chart 45 into closely spaced rows 46 of binary markings shown with exaggerated spacing in FIG. 2. The chart 45 forms a part of an optical projection system which is shown diagrammatically as including a fixed projection lamp 50 and a lens 51 to concentrate the light of the lamp filament on the chart 45. A lens 52 projects an enlarged image of a small vertical extent of the chart rows 46 which is read out to determine the balance position of the scale.

FIG. 2 shows photoelectric means for reading out the portion of the chart 45 corresponding to the weight on the platter, comprising a plurality of photocells 55, one for each of the rows 46, and a cooperating mask 56. Each photocell 55 is positioned immediately behind a slit in the mask 56, but for ease of illustration, the photocells 55 are shown in FIG. 2 as being spaced away from the mask. The photocells 55 undergo a decrease in resistance with light falling on the photocell window, to operate as current gates or valves, and a photocell which has been found useful for this purpose is designated type CL 604 manufactured by Clairex Corporation, 19 West 26th Street, New York, 10, New York.

There are provided as many of the photocells 55 as there are rows of binary information on the chart 45, and in this embodiment, 14 photocells are employed. In order to conserve space within the optical system, and to position the cells 55 as closely to the center of the optical axis as practicable, five photocells are arranged in each of two rows and four in the third row, with each of the photocells 55 being spaced both laterally and vertically from the adjacent cells and from the cells in the adjacent rows.

The mask 55 includes image-defining openings or slits 57, one for each of the photocells 55. The slits 57 may be approximately 0.010 inch wide and are accurately positioned in relation to the projected image of the rows 46 on the chart 45. Accordingly, the relative weight-corresponding positions of the rows on the chart 45 are staggered in three groups in order to conform to the position of the slits 57 in the mask 56, and the slits 57 minimize the necessity for accurate positioning of the photocells with respect to the projected pattern. Readout of the weight is performed in accordance with a cyclic biquinary numbering system as described in detail in U.S. Pat. No. 3,557,353.

The automatic computing scale system is constructed so as to enable adjustment of the tare setting, whenever there is a change in the packaging material for the load, and knob 23 is provided for this purpose. Manual rotation of this knob changes the balance position of the scale through a mechanical linkage. Mechanical apparatus of this type is well known as shown for instance in Allen U.S. Pat. No. 3,037,563; reference thereto being hereby made for further description thereof.

In accordance with this invention there is provided a tare warning light which may be activated after each weighing operation and thereafter turned off by operator contact with the tare adjustment knob. Thus if the operator forgets to make a new tare adjustment, the warning light reminds him of his error. In the event that the operator is weighing a series of articles, all requiring the same tare adjustment, then he makes an initial accurate adjustment and thereafter merely touches the tare adjustment knob prior to each new weighing.

Figure 3:
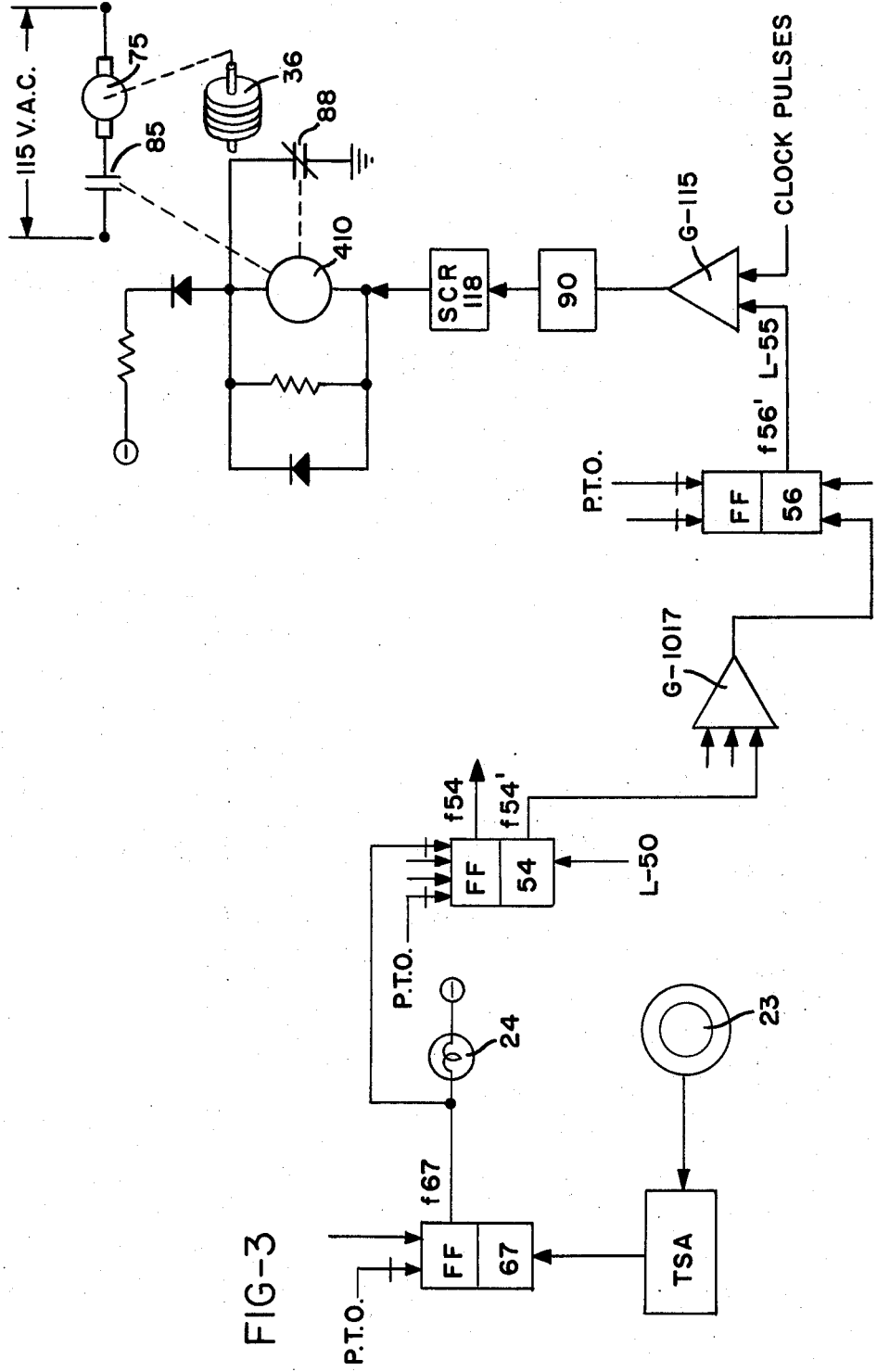
FIG. 3 is an electrical schematic diagram of the tare adjusting circuit for one embodiment of this invention.

An electrical schematic diagram of apparatus for accomplishing tare warning is presented in FIG. 3 which was prepared by combining portions of FIGS. 6 through 15 of Ser. No. 85,139 which in turn corresponds to FIGS. 6 through 16 of Ser. No. 422,730, now Allen U.S. Pat. No. 3,557,353. For clarity of presentation the original reference numerals have been retained, but all circuit elements not forming part of the tare warning feature of the computing scale system have been removed. Further the same symbols and conventions have been employed, including use of negative logic, with the value one being assigned to negative polarity, and the value zero being assigned to positive polarity. Thus the plain triangles G-115 and G-1017 are designated "plus" NAND gates and have a negative output if, and only if, all inputs thereto are positive.

Flip-flops 54, 56 and 67 are represented by double squares and are of the set and reset variety. Thus the input line to FF54 from FF67 has a bar thereacross to indicate that a positive signal thereon will set output f54 positive and output f54' negative. Similarly other input lines at the top of FF54 have no bar to indicate that negative signals thereon will set output f54 positive and output f54' negative. Conversely the unbarred input line to the bottom of FF54 (source not shown) indicates that a negative signal thereon will set output f54' positive and output f54 negative. The P.T.O. (power turn on) symbol in conjunction with the barred input to FF54 represents a network which is effective when the power is turned on to issue a positive signal of sufficient time duration to set output f54 positive and output f54' negative.

Referring to FIG. 3, tare signal light 24 is connected on one side to a source of negative potential and on the other side to output f67 from FF67 so that light 24 is lit when output f67 is positive and is turned off when f67 goes negative. For a P.T.O. arrangement as illustrated, f67 goes positive at power turn on, and light 24 is initially lighted.

The light 24 calls to the operator's attention that the tare may require adjustment, but such adjustment is frequently not actually necessary. Accordingly, in order to make it possible to extinguish light 24 without physically changing the tare adjustment unnecessarily, the adjusting knob 23 is made of metal and connected with flip-flop FF67 through an oscillator TSA to form therewith a touch control unit.

The oscillator TSA may comprise a detuned oscillator or similar device which is excited or triggered into a state of oscillation by bodily contact on the part of the operator with the knob 23, so that it is necessary only for the operator to touch the knob without other physical manipulation thereof, and this will cause the associated oscillator TSA to transmit a negative resetting signal to flip-flop FF67, which will extinguish light 24 by changing to negative the signal from output f67. As used herein the words "tuned" and "detuned" refer to accomplishment of an electrical configuration wherein oscillation is enabled or suppressed without regard to any particular frequency of oscillation.

The circuit illustrated in FIG. 3 also has an interlock to prevent operation of the printer when signal light 24 is lit. As shown in FIG. 3 the printer comprises a printer motor 75 which drives the mechanical parts of printer 30, including the printer wheels 36, and it corresponds to the motor 150 in Allen U.S. Pat. No. 2,948,465. Printer motor 75 is controlled by switch contacts 85 which initially are closed mechanically in response to energization of solenoid 410 and thereafter are held closed by a part of the printing mechanism until the printing cycle is completed, as is described in connection with solenoid 160 and switch contacts 171 in U.S. Pat. No. 2,948,465. The normally closed contacts 88 in the energizing line to solenoid 410 are mechanically controlled by the printer mechanism to open at the same time switch 85 is closed and thereby to deenergized solenoid 410.

Under normal conditions with a tare adjustment having been made, gate G1017 will transmit a negative print starting signal to FF56 causing a positive output f56'. This positive signal is transmitted on line L55 to plus NAND gate G115 where it is combined with a clock pulse to produce a negative signal effective through a transformer-inverter 90 and a silicon controlled rectifier SCR 118 to apply a −24 volt signal to solenoid 410. This energizes the solenoid and effects the closing of switch 85. Thereafter switch contacts 88 are opened and switch 85 is held closed for a full printing cycle as is more fully described in Allen et al. U.S. Pat. No. 3,557,353.

As described previously, a positive pulse occurring at power turn on sets output f67 of FF67 positive for lighting of light 24. This positive output is applied to FF54 thereby setting output f54' negative. The negative output f54' then is applied to gate G-1017. The other inputs to gate G-1017 are normally positive so that the output of G-1017 is normally under the control of f54'. Thus when f54' goes negative as above described, the output from G-1017 cannot go negative. Accordingly FF56 which has had its output f56' restored to negative during the last normal printer register operation, remains in this condition preventing application of the above mentioned −24 volt energizing signal to solenoid 410. This inhibits operation of the printer. When knob 23 is touched for adjusting the tare setting and extinguishing light 24, the previously positive output f67 is removed from operation as an input to FF54. Thereafter a regularly recurring negative pulse on line L-50 sets f54' to the positive state for production of a negative output from gate G-1017 and activation of the printer as above described.

The system as above described with reference to FIG. 3 has primary application to prepackaging operations for mass merchandising, and thus there is ordinarily no requirement for resetting the tare between weighings. Therefore light 24 remains off after the initial tare adjustment and stays off until a negative pulse is applied to the unbarred line at the top of FF67 to reset f67 to the positive state. The negative resetting pulse is generated as described in Allen et al. U.S. Pat. No. 3,557,353 whenever a commodity change is made.

Figures 4, 4A:
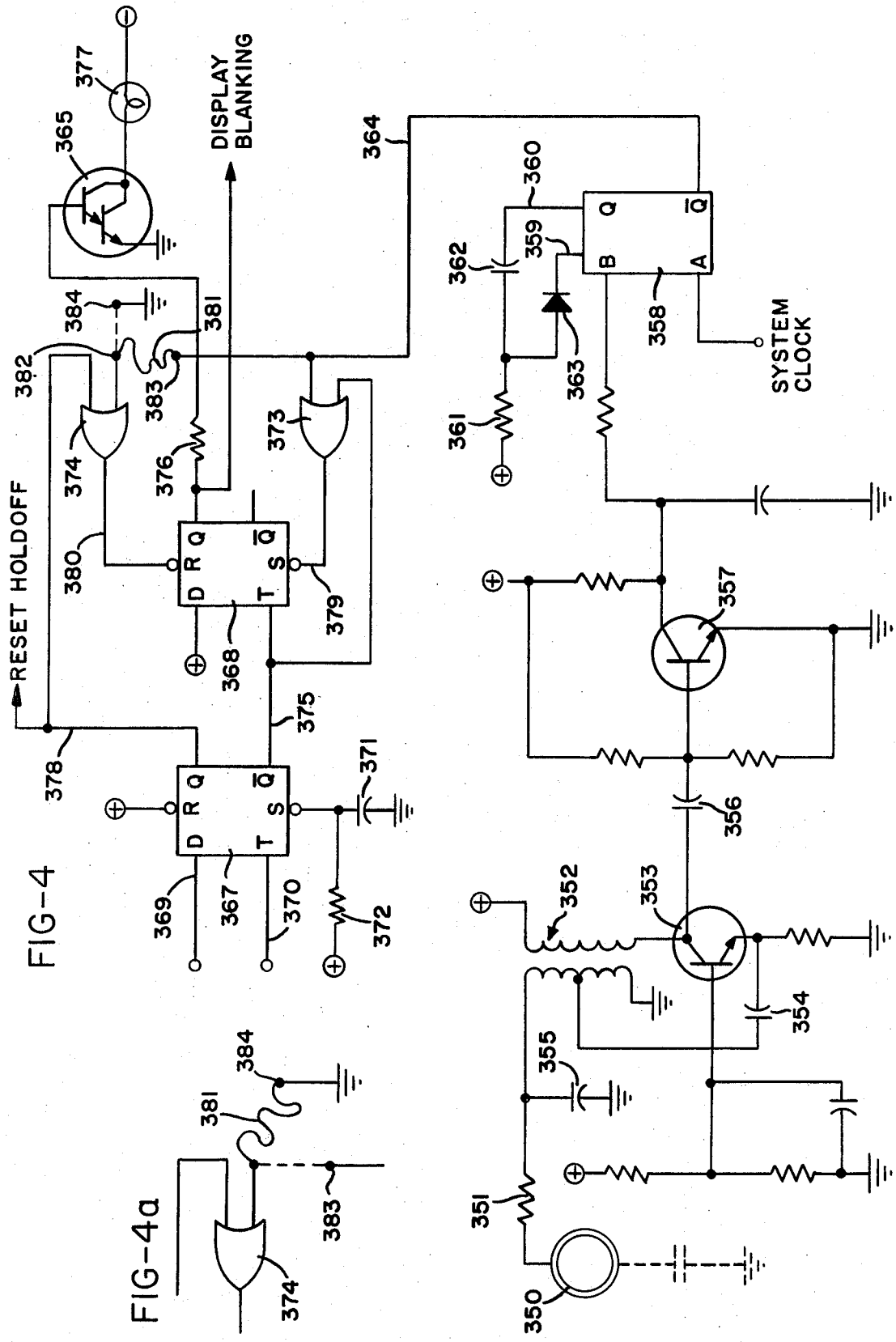
FIG. 4 is an electrical schematic diagram for another embodiment of the invention.
FIG. 4a is a portion of FIG. 4 with an alternate connection.

An alternative embodiment of the touch tare circuit is illustrated with positive logic notation in FIG. 4. As illustrated therein a tare knob 350 is connected through a resistor 351 to one side of a transformer 352. The other side of transformer 352 is connected to a positive potential source, which may be typically about plus 5 volts, and to the collector of transistor 353. The emitter of transistor 353 is fed back through a capacitor 354 to a tap on transformer 352 to create an oscillator circuit. A capacitor 355 also forms a part of this oscillator circuit. The capacitance of capacitor 355 is selected so as to produce a tuned oscillating circuit. This circuit is detuned by body capacitance whenever knob 350 is touched. As in the case for the above described embodiment, knob 350 is connected to means for effecting a tare adjustment, and the mere touching of the knob controls the operation of a tare light 377.

Under normal conditions with the system energized, the regularly recurring conduction of transistor 353 causes a capacitor 356 to remain discharged so that transistor 357 is biased ON and a LO input appears at terminal B of flip-flop 358. When knob 350 is touched for tare adjustment or otherwise, oscillating conduction of transistor 353 ceases, capacitor 356 charges, transistor 357 is biased OFF, and the input to terminal B of flip-flop 358 goes HI.

Flip-flop 358 is a retriggerable mono-stable multivibrator with clear and conveniently may be half of an integrated circuit type SN74123 sold by Texas Instruments, Inc. Terminal A of flip-flop 358 is connected to receive the basic clock signal from the system timing circuit, and input lines 359 and 360 are connected to a positive potential source through a delay circuit comprising resistor 361 capacitor 362 and diode 363. Flip-flop 358 is a negative edge triggered by a clock signal at terminal A to produce a HI signal on output terminal $\overline{Q}$ for a LO signal at input terminal B. When knob 350 is touched by the operator to produce a HI signal at terminal B of flip-flop 358, the next clock pulse on terminal A forces the output at terminal $\overline{Q}$ to go LO. This output remains LO as long as knob 350 is being touched, and thereafter for a continuing period depending upon the design of the delay circuit connected to lines 359 and 360. Typically the delay may be about 700 milliseconds so that the signal at output terminal $\overline{Q}$ will remain LO for approximately 700 milliseconds after knob 350 has been released. Thereafter, the signal at terminal $\overline{Q}$ will go HI.

Flip-flop 358 corresponds roughly to flip-flop 67 of FIG. 3. Accordingly, the signal appearing at output terminal $\overline{Q}$ of flip-flop 358 is carried by a line 364 to a Darlington amplifier 365 which controls the operation of the tare lamp 377. However, line 364 is not directly connected to amplifier 365, but instead controls a logic circuit which in turn drives amplifier 365.

The major elements of the above mentioned logic circuit are a pair of identical flip-flops 367 and 368. Flip-flops 367 and 368 may be fabricated as an integrated circuit, such as a circuit type SN7474 made by Texas Instrument, Inc. These devices are dual D-type edge triggered flip-flops. The construction of these flip-flops is such that output terminal Q takes on the logical state of input terminal D during the positive going edge of a trigger pulse at the clock terminal T. Terminals S and R are preset and clear terminals which operate independently of any clock signal. When a HI signal is present at terminal R, then a LO signal at terminal S will set terminal Q to a HI state. When a HI signal is present at terminal S, then a LO signal at terminal R will set terminal Q to a LO state. The Q and $\overline{Q}$ outputs are complementary.

Input terminals D and T of flip-flop 367 are connected respectively to lines 369 and 370 which in turn are connected to receive respectively a minimum weight signal and a reset signal. The minimum weight signal is LO whenever the weight read out by the scale is less than some nominal value and is HI when the reading exceeds that value. Typically this minimum control reading may be about one tenth of a pound. Any convenient method may be employed for generating such a minimum weight signal. Suitable apparatus for this purpose is shown for instance in Allen U.S. Pat. No. 3,439,760. The reset signal for line 370 is merely a pulse which occurs once each computing cycle.

Ordinarily the circuit of FIG. 4 will find particular utility in a computing scale system for use in over-the-counter sales and the like. Such a scale system may be equipped with a digital read-out as shown for instance in copending patent application Ser. No. 139,372, assigned to the assignee of this application. For such a computing scale it is undersirable to have a flickering digital readout which would be the result of continuous computing and reading during scale movement. Thus as described in Ser. No. 139,372 there is provided a hold-off circuit to maintain a constant digital reading for a predetermined holding period ranging from about 0.5 to about 1.5 seconds. At the end of this period there is generated a reset signal which for the purposes herein may be applied to line 370.

As further shown in FIG. 4, the R terminal of flip-flip 367 is connected to a positive potential source, whereas the S terminal is connected to ground through a capacitor 371 and also to a source of positive potential through resistor 372. The capacitor 371 performs a time delay function so that when the power is first turned on there is a HI signal at terminal R and a LO signal at terminal S. This produces a HI output at terminal Q of flip-flop 367 and a LO output at terminal $\overline{Q}$ when the power is first turned on. Thereafter if there is a LO signal at line 369 (weight below minimum weight), then with the first occurrence of a reset pulse on line 370, terminal Q will go LO and terminal $\overline{Q}$ will go HI. This change in the output of terminal $\overline{Q}$ from an initial LO condition to a subsequent HI condition produces a positive edge trigger for use by flip-flop 368 as hereinafter described.

The preset and clear terminals of flip-flop 368 are connected to the output terminals of OR gates 372 and 374 both of which are connected to receive inputs from line 364, which in turn carries the output from the $\overline{Q}$ terminal of flip-flop 358. As described previously, line 364 carries a normally HI signal, and is switched temporarily to the LO condition when the operator touches knob 350. Thus OR gates 373 and 374 normally supply HI signals to terminals S and R of flip-flop 368. Input terminal D of flip-flop 368 is permanently connected to a source of positive potential, and input terminal T is connected by line 375 to receive the output from terminal $\overline{Q}$ of flip-flop 367. As described above with reference to flip-flop 367, line 375 assumes a LO state at power turn on, and shortly thereafter goes HI. This provides a positive going trigger for terminal T of flip-flop 368, thereby putting output terminal Q of flip-flop 368 in the HI state. Output terminal Q is connected by line 376 to Darlington amplifier 365 which in turn is connected to one side of tare lamp 377. The other side of tare lamp 377 is connected to a source of negative potential so that when line 376 goes HI tare lamp 377 is lighted. Simultaneously with the lighting of tare lamp 377 there is generated a display blanking signal which may be used for blanking an illuminated digital display as described for instance in Ser. No. 139,372.

Concomitantly with the HI signal on line 375 there is a LO signal on line 378 which is connected to the input side of OR gate 374. If tare knob 350 is touched during this period of time the signal on line 364 will go LO and thus a LO signal will be generated at the output terminal of OR gate 374. However, the output terminal of OR gate 373 will generate a HI signal at this time because one input terminal of OR gate 373 is connected to line 375. Thus with the touching of knob 350 flip-flop 368 receives a LO at its R terminal and a HI at its S terminal. Therefore the signal on line 376 goes LO, with the result that tare lamp 377 is turned off and the display blanking signal is terminated. Thereafter when weight is applied to the scale, the next occurring reset pulse on line 370 will flip the outputs of flip-flop 367 so that line 378 goes HI and line 375 goes LO. By this time the signal on line 364 will have again gone HI so that the flipping of the outputs from flip-flop 367 can have no effect on the output from flip-flop 368. Consequently the signal on line 376 will remain LO and tare lamp 377 will remain off. Then, when the weighing operation is completed and the merchandise is removed from the scale, the output signals from flip-flop 367 will flip. This results in a change from a LO to a HI condition on line 375 thereby triggering flip-flop 368 for lighting tare lamp 377. The system is then prepared for the next cycle of operation.

The circuit illustrated in FIG. 4 further provides an error detecting feature to provide a warning if the operator touches the tare adjustment while a product is being weighed on the scale. Thus, if tare knob 350 is touched while line 378 is HI and 375 is LO the resulting LO on line 364 will produce a LO on line 379. This will immediately produce a HI output on line 376, light the tare lamp 377 and blank out the digital display. The customer will know that something is amiss, even though he may not see the operator touch the tare adjustment, and the operator will be obliged to repeat the entire weighing process. That is, tare lamp 377 will remain lighted until lines 378 and 364 both go LO to produce a LO on line 380. As mentioned above, these conditions occur only by touching knob 350 when the scale reading is below the minimum weight reading.

In connection with the above mentioned error detecting feature it will be noted that line 378 does not go HI immediately upon the loading of the scale, but instead awaits the occurrence of a reset pulse on line 370. Thus a fast operator could make an undetected tare adjustment after scale loading if he were able to complete the adjustment prior to the occurrence of a reset pulse. This means that reset pulses must be generated at closely spaced intervals during the weighing operation. However, as discussed above, it is desirable after loading of the scale to avoid a flickering digital readout by spacing out computing cycles, and this in turn necessarily holds back the reset pulses for a time period ranging up to about 1 ½ seconds. These diverse requirements may be met by connecting line 378 to a holdoff circuit (not shown). When the signal on line 378 is HI the holdoff circuit is enabled to space out the computing cycles, but when the signal on line 378 is LO the computing cycles continually repeat thereby generating closely spaced reset pulses. Thus there is insufficient time for the operator to readjust the tare setting between the loading of the scale and the flipping of flip-flop 367.

For use of the circuit of FIG. 4 in another mode, there may be provided a jumper 381. Maintenance personnel may move jumper 381 from the position illustrated in FIG. 4 to the alternate position shown in FIG. 4a wherein terminals 382 and 384 are connected and the connection between terminals 382 and 383 is opened. This effectively places a steady state LO at point 382 so that line 380 always carries the same signal as line 378.

In this mode the tare lamp is not ordinarily lighted and is activated only if the operator touches tare knob 350 while a load is on the scale. This may be understood by observing that in this condition there is generated a LO input to terminal S and a HI input to terminal R of flip-flop 368. This set of inputs produces a HI on line 376 which is the requirement for lighting tare lamp 377. The tare lamp cannot be lighted prior to a normal weighing operation with no weight on the scale because at this time there is a HI input at terminal S and a LO input at terminal R of flip-flop 368. This condition necessarily produces a lamp extinguishing LO on line 376.

It will be observed that in this alternate mode with the jumper as illustrated in FIG. 4a, there is a decreased penalty associated with an accidental touching of tare knob 350 while the scale is weighing and producing a HI on line 369. Thus, the operator need only unload the scale to produce a LO on line 369 until the next occurrence of a reset pulse on line 370. This will flip the outputs from flip-flop 367, thereby producing a LO on line 378 and clearing flip-flop 368 to give a LO output on line 376. Tare lamp 377 will then be switched off and the scale may be released.

While the forms of apparatus herein described constitute preferred embodiments of the invention, it is to be understood that the invention is not limited to these precise forms of apparatus, and that changes may be made therein without departing from the scope of the invention.

What is claimed is:

1. In a system for weighing loads and recording data including the weight thereof, the combination comprising a weighing mechanism adapted to be deflected from a no load reference position to a balance position in proportion to the weight of the load application thereto, means responsive to establishment of said balance position for each load for recording the data with respect to said load, tare adjusting means including contact means for establishing said no load reference position of said weighing mechanism, presettable means requiring actuation by the operator to condition said system for operation, signal means responsive to actuation of said presettable means to cause a warning signal associated with said tare adjusting means, and means responsive to contact by the operator with said contact means for terminating said warning signal.

2. The combination defined in claim 1 wherein said contact means comprises a metal control member, and oscillator means connected between said control member and said signal means and responsive to contact by the operator with said control member to reset said signal means to terminate the warning signal therefrom.

3. In a scale system having tare adjustment means, tare adjustment indicating means comprising:
   a. a tare warning indicator for producing a continuous tare warning indication upon activation thereof,
   b. means for activating said indicator prior to the weighing of an article by said scale system,
   c. a knob connected for control of said tare adjustment means,
   d. an oscillation circuit connected for alteration of its oscillation state whenever said knob is touched by an operator, and
   e. means responsive to said oscillation state alteration for deactivating said indicator and terminating the continuous tare warning therefrom.

4. Apparatus according to claim 3 further comprising means for generating a minimum weight indicating signal whenever the tare adjusted reading of said scale system exceeds a predetermined minimum value and means responsive to said oscillation state alteration for activating said indicator whenever said oscillation state alteration occurs during generation of said minimum weight indicating signal.

5. Apparatus according to claim 3 said oscillation circuit being tuned for normal continuous oscillation thereof and connected for detuning and suppression of oscillation whenever said knob is being touched by an operator.

6. In a scale system comprising a weighing mechanism adapted to be deflected from a no load reference position to a balance position in proportion to the weight of a load applied thereto, means for indicating said balance position as a measure of the weight of said load, tare adjusting means for establishing said no load reference position, and means for generating a minimum weight signal when the indicated balance position exceeds a predetermined amount; tare adjustment indicating means comprising:
   a. a tare warning indicator for providing an indication thereof when said scale system returns to an unloaded condition,
   b. manually positionable control means connected to said tare adjusting means,
   c. an oscillation circuit connected for alteration of its oscillation state whenever said control means are touched by an operator, and
   d. means responsive to said oscillation state alteration for deactivating said tare warning indicator to indicate that said control means have been touched.

7. Apparatus according to claim 6 said tare warning indicator comprising a normally lighted light connected for indication of a touching of said control means by being turned off.

8. Apparatus according to claim 7 further comprising means for lighting said light whenever said oscillation state alteration occurs during generation of said minimum weight signal and means for keeping said light thereafter lighted until said oscillation state alteration occurs during the absence of said minimum weight signal.

9. Apparatus according to claim 8 said oscillation circuit being tuned for normal continuous oscillation thereof and connected to said control means for detuning by capacitive coupling to ground whenever said control means are touched by an operator.

10. Apparatus according to claim 9 said control means comprising an electrically conductive knob.

11. In a scale system having tare adjustment means, tare adjustment indicating means comprising:
 a. a tare warning indicator for producing a tare warning indication upon activation thereof,
 b. manually positionable control means connected for operation of said tare adjustment means,
 c. an oscillation circuit connected for alteration of its oscillation state whenever said control means are touched by an operator, and
 d. means responsive to said oscillation state alteration for activating said tare warning indicator.

12. Apparatus according to claim 11 said tare warning indicator comprising a light connected to be turned on whenever said scale system goes from a loaded condition to an unloaded condition.

13. Apparatus according to claim 12 said light being connected to be turned on whenever said oscillation state alteration occurs during a loaded condition of said scale system.

14. Apparatus according to claim 11 said tare warning indicator comprising a light connected to be turned on whenever said oscillation state alternation occurs during a loaded condition of said scale system.

15. Apparatus according to claim 14 further comprising means to maintain a lighted condition of said light until said control means are touched by an operator during an unloaded condition of said scale system.

16. In a scale system comprising a lighted display for providing an indication of the weight of a product being weighed, tare adjustment means for compensating for the weight of a container for said product, and means for generating a minimum weight indicating signal whenever the tare adjusted weight indication of said scale system exceeds a predetermined minimum value; tare adjustment indicating means comprising;
 a. a tare warning indicator for producing a tare warning indication upon activation thereof,
 b. manually positionable control means connected for operation of said tare adjustment means,
 c. means for generating an electrical response signal whenever said control means are touched by an operator, and
 d. means connected for receiving said minimum weight indicating signal and said response signal and operative in response to the joint occurrence thereof to activate said tare warning indicator and blank said lighted display.

* * * * *